(No Model.)
E. WINGATE.
GUANO DISTRIBUTER.
No. 500,246. Patented June 27, 1893.
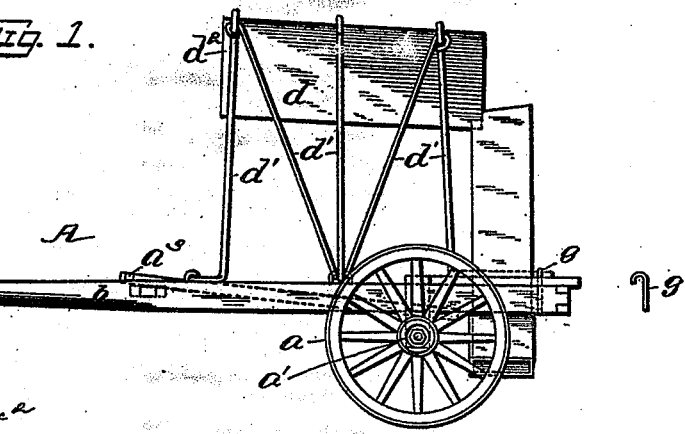
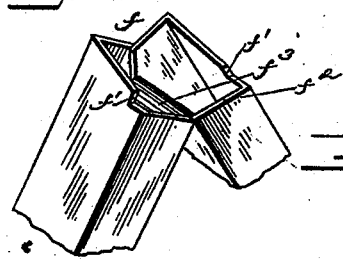
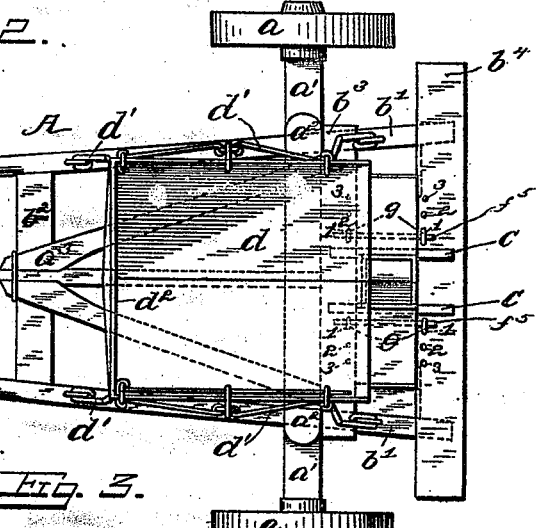
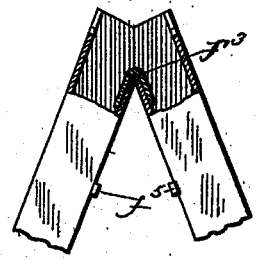
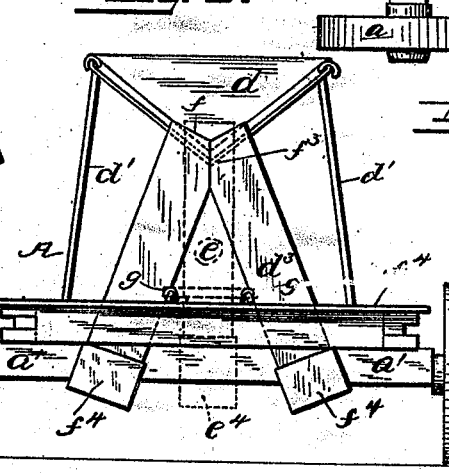
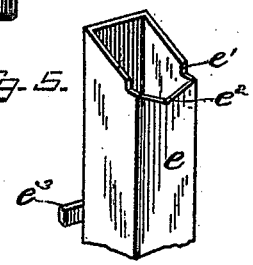
Attest:
Walter Tamariel
Rose E. Rabbitt.
Inventor:
Enoch Wingate.
By John L. Duffie Attorney

UNITED STATES PATENT OFFICE.

ENOCH WINGATE, OF MINTON, GEORGIA.

GUANO-DISTRIBUTER.

SPECIFICATION forming part of Letters Patent No. 500,246, dated June 27, 1893.

Application filed February 6, 1893. Serial No. 461,238. (No model.)

*To all whom it may concern:*

Be it known that I, ENOCH WINGATE, a citizen of the United States, residing at Minton, in the county of Worth and State of Georgia, have invented certain new and useful Improvements in Guano-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a machine for the distribution of manures of various kinds, but is intended more especially for the distribution of stable and other rough manures. In the distribution of the rough manures the operator stands on the rear platform and drags the manure gradually into the upper end or ends of the chute or chutes with a light rake or other suitable implement, through which chute or chutes it falls into the furrow or furrows below.

My machine is constructed so as to manure a single row or two rows at a time. When I wish to manure one row at a time I use a single chute, and when I wish to manure two at a time, I use a double chute or two chutes.

In the accompanying drawings: Figure 1, is a side elevation of my invention. Fig. 2, is a top plan view, and Fig. 3, is a rear end view of my invention. Fig. 4, is a view of the upper part of the double chute with its front side broken away and Fig. 5, is a perspective view of the upper end of the single chute. Fig. 6, is a view of the upper end of the double chute showing the V shaped seat.

My invention is described as follows: A represents a truck, consisting of the wheels $a$, axle $a'$, bolster $a^2$, and hounds $a^3$, made very much like the rear running gear of a wagon, except the hounds do not extend beyond the rear face of the axle $a'$. In using my invention the rear gear of a wagon may be employed. Between the axle and the bolster, and on the outside of the hounds, is secured a pair of shafts $b$, having rear extensions $b'$, and a front cross brace $b^2$, to which the front ends of the hounds are secured. On the rear ends of said shafts and just in rear of the bolster is secured a cross piece $b^3$, provided with perforations 1, 2, 3, and 1, 2, 3. To the extreme rear ends of said shafts is secured another cross piece $b^4$, having perforations 1, 2, 3, and 1, 2, 3, corresponding with the perforations in the cross piece $b^3$. Secured to the cross pieces $b^3$, and $b^4$, are longitudinal braces $c$. A body, or manure holder $d$, is elevated on braces $d'$. Said body is closed at its front end $d^2$, its rear end being open. Said body is V shaped, the point of the V being downward, and the rear end of said body is a little lower than its front end, so that the inclination of the manure will be to work backward and flow into the chutes. The single chute $e$, has a recess $e'$, cut in its front side and in its front wall is a V shaped seat $e^2$, for the rear end of the body to rest in. To the front wall of said chute is secured a cross piece $e^3$, and to the foot of said chute is secured a shoe $e^4$, of leather or other flexible material, so that it may yield when coming in contact with clods, stones, or the like. When the single chute is used it rests between the longitudinal braces $c$, with its cross piece $e^3$, resting upon said pieces $c$, with the rear end of the body resting in its V shaped seat $e^2$. The double chute $f$, has in its upper ends recesses $f'$, and has its front walls so cut that when the two chutes come together they form a V shaped seat $f^2$, in which the rear end of the body $d$, rests. The two parts of the double chute are hinged together by any character of flexible material $f^3$, and the chute is so constructed that its lower ends may be placed wide apart or near together. The lower ends of said chute are provided with shoes $f^4$, of leather or other flexible material, and have secured to them cross pieces $f^5$. Said chute rests under the body $d$, with its rear end resting in its V shaped seat $f^3$, its inner walls against the longitudinal pieces $c$, and its cross pieces $f^5$, against the upper faces of the cross pieces $b^3$, and $b^4$, and are held in place by staples $g$. When the rows are narrow the chutes are secured at the perforations 1, 1; when wider at the perforations 2, 2; when still wider at the perforations 3, 3. These perforations are regulated according to the kinds of crops raised by the farmer and may be regulated by himself.

Having described my invention, what I claim as new, and desire to secure by Letters Patent, is—

1. In combination with the truck A, substantially as shown and described, the shafts $b$, having the rear extensions $b'$; cross piece $b^3$, secured to said extensions in rear of the axle, provided with perforations 1, 2, 3; cross piece $b^4$, secured to the extreme rear ends of said shafts provided with perforations 1, 2, 3; longitudinal braces $c$, secured to said cross pieces; body $d$, elevated above the shafts on braces $d'$; said device adapted to carry either of the chutes $e$ or $f$, to convey manure from the body to the furrows, substantially as shown and described and for the purposes set forth.

2. In combination with the truck A, substantially as shown and described, the shafts $b$, having the rear extensions $b'$; cross pieces $b^3$, secured to said extensions in rear of the axle, provided with perforations 1, 2, 3; cross piece $b^4$, secured to the extreme rear ends of said shafts with perforations 1, 2, 3; longitudinal braces $c$, secured to said cross pieces, body $d$, elevated above the shaft on braces $d'$; and chute $f$, hinged by flexible connection $f^3$, and having cross pieces $f^5$, flexible shoes $f^4$, and V shaped seat $f^2$; the lower ends of said chutes adjustable to the perforations 1, 2, 3, by means of staples $g$, substantially as shown and described and for the purposes set forth.

3. The combination of the truck A; the shafts $b$, having the rear extensions $b'$, front cross brace $b^2$, rear cross pieces $b^3$, and $b^4$, having perforations 1, 2, 3, and longitudinal braces $c$; V shaped body $d$, elevated above said shafts by braces $d'$; adjustable double chute $f$, provided with V shaped seat $f^2$, flexible shoes $f^4$, and cross pieces $f^5$, and staples $g$, adapted to fit over the cross pieces $f^5$, and enter the perforations 1, 2, 3, and thus adjust the chute, substantially as shown and described and for the purposes set forth.

In testimony whereof I affix my signature in presence of two witnesses.

ENOCH WINGATE.

Witnesses:
ROSE E. RABBITT,
J. S. PARHAM.